US007930560B2

(12) United States Patent
Saito et al.

(10) Patent No.: US 7,930,560 B2
(45) Date of Patent: Apr. 19, 2011

(54) PERSONAL INFORMATION MANAGEMENT SYSTEM, PERSONAL INFORMATION MANAGEMENT PROGRAM, AND PERSONAL INFORMATION PROTECTING METHOD

(75) Inventors: Shinichi Saito, Tokyo (JP); Hisao Kato, Tokyo (JP)

(73) Assignee: Kabushiki Kaisha Oricom, Tokyo (JP)

( * ) Notice: Subject to any disclaimer, the term of this patent is extended or adjusted under 35 U.S.C. 154(b) by 917 days.

(21) Appl. No.: 11/826,669

(22) Filed: Jul. 17, 2007

(65) Prior Publication Data
US 2009/0022321 A1    Jan. 22, 2009

(51) Int. Cl.
G06F 11/30 (2006.01)
G06F 17/30 (2006.01)
(52) U.S. Cl. .......................... 713/193; 713/189; 726/26
(58) Field of Classification Search ................... 713/193, 713/189; 726/26
See application file for complete search history.

(56) References Cited

U.S. PATENT DOCUMENTS
2004/0128557 A1  7/2004  Sakushima et al.
2004/0172550 A1  9/2004  Sai FOREIGN PATENT DOCUMENTS
| JP | 9-185544 A | 7/1997 |
| JP | 11-272681 | 10/1999 |
| JP | 2001-101316 | 4/2001 |
| JP | 2004-145755 | 5/2004 |
| JP | 2004-259202 A | 9/2004 |
| JP | 2004-318391 | 11/2004 |
| JP | 2005-310126 A | 11/2005 |
| JP | 2006-189925 | 7/2006 |
| WO | WO 02/03215 | 1/2002 |

OTHER PUBLICATIONS

Natural Search Queries for Consumer-Oriented Databases; Lipczak, M.; Milios, E.; Autonomic and Autonomous Systems, 2007. ICAS07. Third International Conference on ; Publication Year: 2007 , p. 62.*
Collaborative Agents Supported Automatic Physical Database Design Based on Description Logics Reasoning; Tian-Lei Hu; Gang Chen; Yin-Jie Hong; Xiao-Long Zhang; Jin-Xiang Dong; Computer Supported Cooperative Work in Design, 2006. CSCWD '06. 10th International Conference on; Publication Year: 2006 , pp. 1-6.*

(Continued)

*Primary Examiner* — David Y Jung
(74) *Attorney, Agent, or Firm* — Buchanan Ingersoll & Rooney PC (57) ABSTRACT

The present invention provides a personal information management system, a personal information management program and a personal information protecting method capable of storing personal information in consideration of security protection and facilitating utilization of the stored information. A personal information management system for handling personal information has a function of connection to a personal information dispersion management server that provides functions of encrypting personal information by the secret sharing scheme and decrypting the encrypted personal information with an index key for decrypting. The system has a search keyword management database storing the index key for decrypting and a personal information managing apparatus. When a request for storing personal information requiring security protection is generated, the personal information is divided and stored in the personal information dispersion management server, and the personal information is stored so as to be associated with the index key for decrypting into the search keyword management database.

9 Claims, 8 Drawing Sheets

| PROTECTION LEVEL OF DATA MODEL | PROTECTION LEVEL OF ATTRIBUTE | NON RETRIEVAL OBJECT | RETRIEVAL OBJECT | CONCRETE EXAMPLES |
|---|---|---|---|---|
| PERSON SPECIFYING INFORMATION IS INCLUDED (TYPE A) | PERSON SPECIFYING INFORMATION (a1 TYPE) | STORAGE ONLY IN DISPERSION MANAGEMENT SERVER | HASH VALUE IS STORED IN KEYWORD MANAGEMENT DB | NAME, TELEPHONE NUMBER, AND THE LIKE |
| | SEMI PERSON SPECIFYING INFORMATION (a2 TYPE) | STORAGE ONLY IN DISPERSION MANAGEMENT SERVER | ENCODED TEXT IS STORED IN KEYWORD MANAGEMENT DB | TYPE OF BUSINESS, THE NUMBER OF EMPLOYEES IN WORKPLACE, AND THE LIKE |
| | NON-CONFIDENTIAL INFORMATION (a3 TYPE) | STORAGE ONLY IN DISPERSION MANAGEMENT SERVER | PLAIN TEXT IS STORED IN KEYWORD MANAGEMENT DB | DATE OF BIRTH, POSTAL CODE, AND THE LIKE |
| SEMI PERSON SPECIFYING INFORMATION IS INCLUDED (TYPE B) | SEMI PERSON SPECIFYING INFORMATION (b1 TYPE) | | ENCODED TEXT IS STORED IN KEYWORD MANAGEMENT DB | ANSWERS TO QUESTIONNAIRE (DEPENDING ON QUESTIONS) AND THE LIKE |
| | NON-CONFIDENTIAL INFORMATION (b2 TYPE) | | PLAIN TEXT IS STORED IN KEYWORD MANAGEMENT DB | ANSWERS TO QUESTIONNAIRE (DEPENDING ON QUESTIONS) AND THE LIKE |
| ONLY NON-CONFIDENTIAL INFORMATION (TYPE C) | NON-CONFIDENTIAL INFORMATION (c1 TYPE) | | PLAIN TEXT IS STORED IN KEYWORD MANAGEMENT DB | MANAGEMENT INFORMATION OF QUESTIONNAIRE AND THE LIKE |

OTHER PUBLICATIONS

Search Engine Design Based on Web Service and Lucene; Hongbin Zhang; Juefu Liu; Information Engineering, 2009. ICIE '09. WASE International Conference on vol. 2; Publication Year: 2009, pp. 458-461.*

HANBA, "Enterprise Security, Action to be taken now, 6th easy Privacy Protection Technology Secret Sharing Encryption, N+1 Network, Softbank" Publishing Kabushiki Kaisha May 1, 2003, vol. 3, No. 55, pp. 106-109.

Notice of Ground of Rejection issued in the corresponding Japanese Patent Application No. 2004-381710 dated Jun. 1, 2010, and an English Translation thereof.

FreeBSD 5.4-Release, UNIX User vol. 14, No. 7 Jul. 1, 2005, p. 56-61.

PCT/ISA/237 for PCT/JP2007/062667.

Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2007/062667, Feb. 12, 2009, The International Bureau of WIPO, Geneva, CH.

Kato, U.S. Appl. No. 12/304,516, entitled "Personal Information/Confidential Information Managing System and Personal Information/Confidential Information Managing Method" filed Dec. 12, 2008.

* cited by examiner

| PROTECTION LEVEL OF DATA MODEL | PROTECTION LEVEL OF ATTRIBUTE | NON RETRIEVAL OBJECT | RETRIEVAL OBJECT | CONCRETE EXAMPLES |
|---|---|---|---|---|
| PERSON SPECIFYING INFORMATION IS INCLUDED (TYPE A) | PERSON SPECIFYING INFORMATION (a1 TYPE) | STORAGE ONLY IN DISPERSION MANAGEMENT SERVER | HASH VALUE IS STORED IN KEYWORD MANAGEMENT DB | NAME, TELEPHONE NUMBER, AND THE LIKE |
| | SEMI PERSON SPECIFYING INFORMATION (a2 TYPE) | STORAGE ONLY IN DISPERSION MANAGEMENT SERVER | ENCODED TEXT IS STORED IN KEYWORD MANAGEMENT DB | TYPE OF BUSINESS, THE NUMBER OF EMPLOYEES IN WORKPLACE, AND THE LIKE |
| | NON-CONFIDENTIAL INFORMATION (a3 TYPE) | STORAGE ONLY IN DISPERSION MANAGEMENT SERVER | PLAIN TEXT IS STORED IN KEYWORD MANAGEMENT DB | DATE OF BIRTH, POSTAL CODE, AND THE LIKE |
| SEMI PERSON SPECIFYING INFORMATION IS INCLUDED (TYPE B) | SEMI PERSON SPECIFYING INFORMATION (b1 TYPE) | ENCODED TEXT IS STORED IN KEYWORD MANAGEMENT DB | | ANSWERS TO QUESTIONNAIRE (DEPENDING ON QUESTIONS) AND THE LIKE |
| | NON-CONFIDENTIAL INFORMATION (b2 TYPE) | PLAIN TEXT IS STORED IN KEYWORD MANAGEMENT DB | | ANSWERS TO QUESTIONNAIRE (DEPENDING ON QUESTIONS) AND THE LIKE |
| ONLY NON-CONFIDENTIAL INFORMATION (TYPE C) | NON-CONFIDENTIAL INFORMATION (c1 TYPE) | PLAIN TEXT IS STORED IN KEYWORD MANAGEMENT DB | | MANAGEMENT INFORMATION OF QUESTIONNAIRE AND THE LIKE |

FIG.8

PERSONAL INFORMATION MANAGEMENT SYSTEM, PERSONAL INFORMATION MANAGEMENT PROGRAM, AND PERSONAL INFORMATION PROTECTING METHOD

BACKGROUND OF THE INVENTION

1. Field of the Invention

The present invention relates to a personal information management system, a personal information management program, and a personal information protecting method capable of storing personal information in consideration of security protection and facilitating utilization of the stored information.

2. Description of the Related Art

Various methods for storing personal information while considering security protection have been being devised. For example, in a method disclosed in Japanese Unexamined Patent Publication No. 2004-145755, in the case of storing important secret data, the original data is not simply encrypted but is subjected to secret sharing, and the dispersed data is stored. The disperse data can be reconstructed without being managed in a lump.

The principal objective of the conventional techniques, however, is data security protection of secret information and personal information, and particularly no attention is paid to utilization method and convenience of the protected data. The method disclosed in Japanese Unexamined Patent Publication No. 2004-145755 also does not describe a utilization method at the user level such that how the user accesses data stringently protected and utilizes the data for his/her work.

SUMMARY OF THE INVENTION

Consequently, an object of the present invention is to provide a user-friendly function capable of freely retrieving information requested by the user. In other words, the present invention is directed to satisfy contradictory objects of security protection of information and convenience in utilization.

To solve the technical drawbacks, the present invention employs the following configurations.

The invention according to a first aspect provides a personal information management system for handling personal information, having a function of connection to a personal information dispersion management server that provides functions of encrypting personal information by the secret sharing scheme and decrypting the encrypted personal information with an index key for decrypting. The system includes a search keyword management database and a personal information managing apparatus. The index key for decrypting which is associated with a group of personal information keywords is stored in the search keyword management database. The personal information managing apparatus includes: storage handling means for determining protection level of personal information and determining a storage form on the basis of the determined protection level; data storing means, when a request for storing personal information requiring security protection is generated, for transmitting the personal information to the personal information dispersion management server, obtaining the index key for decrypting from the personal information dispersion management server, and storing the personal information so as to be associated with the index key for decrypting into the search keyword management database; and data obtaining means, when a personal information obtaining request is generated, for retrieving the index key for decrypting with reference to the search keyword management database, transmitting the index key for decrypting to the personal information dispersion management server, and receiving the personal information decrypted with the index key for decrypting from the personal information dispersion management server.

According to a second aspect of the present invention, with reference to data model attribute definition specifying data characteristics of personal information, the storage handling means determines that information uniquely specifying a person has high protection level, information in plural pieces by which a person can be specified has intermediate protection level, and information by which a person cannot be specified has low protection level, and determines a storage form in accordance with the protection level.

According to a third aspect of the present invention, in personal information to be stored in the search keyword management database, an attribute having the high protection level is hashed, an attribute having the intermediate protection level is encrypted and stored, and an attribute having the low protection level is stored in a plain text as it is.

A forth to sixth aspects of the present invention also provides a personal information management program for making the personal information managing apparatus in the personal information management system manage (store and acquire) data.

A seventh aspect of the present invention also provides a personal information protecting method including the steps of: encrypting a data item requiring security protection by the secret sharing scheme, in data items constructing personal information; storing the encrypted data item into a database; storing an index key for decrypting the encrypted data in the database; hashing or encrypting a data item requiring security protection and storing the hashed or encrypted data so as to be associated with the index key into the database; and storing a data item in a plain text requiring no security protection as it is into the database.

In the present invention, "personal information" denotes information including data to be under confidentiality typified by personal information. Therefore, the personal information is not limited to personal information in a narrow sense. "Encoding of data by the secret sharing scheme and decrypting of encrypted data with the index key for decrypting" denotes that data is divided into some pieces, the divided data is stored, and the original data is reconstructed by using information for reconstruction provided for the divided data. The "secret sharing scheme" is mentioned as a representative of a method of dividing data and storing the divided data, and data may be divided by other methods.

The information for reconstructing the divided data to the original data is also called a keyword or the like. In the present invention, the information will be expressed as an "index key for decrypting" to distinguish the information from a group of search keywords in the search keyword management database. In an embodiment, "document ID" and "title of document" correspond to the information.

The "search keyword management database" is a database for storing a group of keywords for obtaining the divided and stored data by using the index key for decrypting. The database also includes information which is not used as a keyword, such as statistical information and an access log. However, since the main purpose of the database is to store a keyword group, the database is expressed as the "search keyword management" database.

The "protection level" expresses a level of information which cannot uniquely specify a person, a level of information uniquely specifying a person, and a level of information obtained by combining a plurality of attributes, which can uniquely specify a person. In the embodiment, the information is also called non-confidential information, person specifying information, and semi person specifying information, respectively.

According to the first to seventh aspects of the present invention, both of the functions which are inherently contradictory to each other such that secret information can be safely stored and easily utilized can be realized.

Generally, original data is very stringently protected by dispersion management. However, since the personal information is dispersed in a plurality of media, basically, the personal information can be retrieved only by the index key for decrypting. Consequently, the personal information cannot be usually retrieved by using any of the personal information (for example, name). In the present invention, however, information which can be a search keyword and the index key for decrypting is associated with each other and managed in different storing media. Therefore, in the present invention, the dispersed information can be reconstructed as necessary and utilized.

According to the second and fifth aspects of the present invention, the security protection level can be freely set according to description of the data model attribute definition, and data management in a proper form can be performed in accordance with the set level. Only by changing a file, a change in a transaction can be addressed, so that it is unnecessary to modify software.

According to the third and sixth aspects of the present invention, data is hashed, encrypted, or unprocessed according to the security protection level, and the hashed or encrypted data or the data remaining in a plain text is stored in the search keyword management database. The degree of stringency on handling of data is increased as the necessity of protection increases, and non-confidential data is stored in a plain text as described above, thereby realizing convenience of a totaling process and the like.

DESCRIPTION OF THE PREFERRED EMBODIMENTS

1. System Configuration

Figure 1:
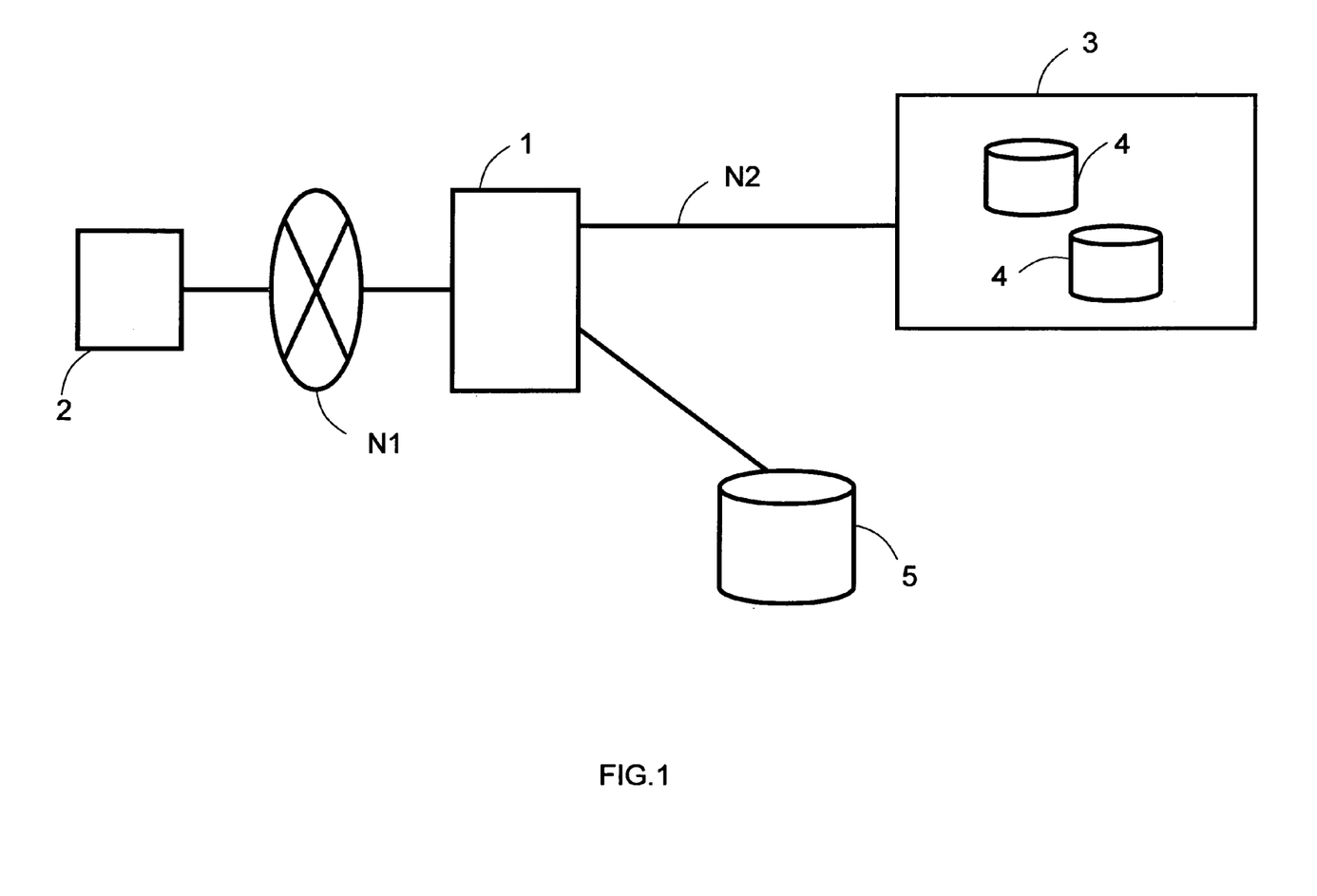
FIG. 1 is a diagram showing a system configuration of an embodiment.

FIG. 1 shows a system configuration of an embodiment.

A personal information managing apparatus 1 is connected to a user terminal 2 via a communication network N1 such as the Internet. The personal information managing apparatus 1 is also connected to a personal information dispersion management server 3 (hereinbelow, "dispersion management server 3") via a communication network N2. The dispersion management server 3 has a plurality of storing media 4 for storing pieces of data obtained by dividing original data.

Further, the personal information managing apparatus 1 can access a search keyword management database 5 (hereinbelow, "keyword management DB 5"). The keyword management DB 5 may be stored in an internal storage of the personal information managing apparatus 1 or an external storage, or may be stored in a storage of a database server as a computer different from the personal information managing apparatus 1.

In the case of transmitting/receiving data over the networks N1 and N2, desirably, the data undergoes any encrypting on communication paths.

Configuration of Back End Module (Including Core System)

Figure 2:
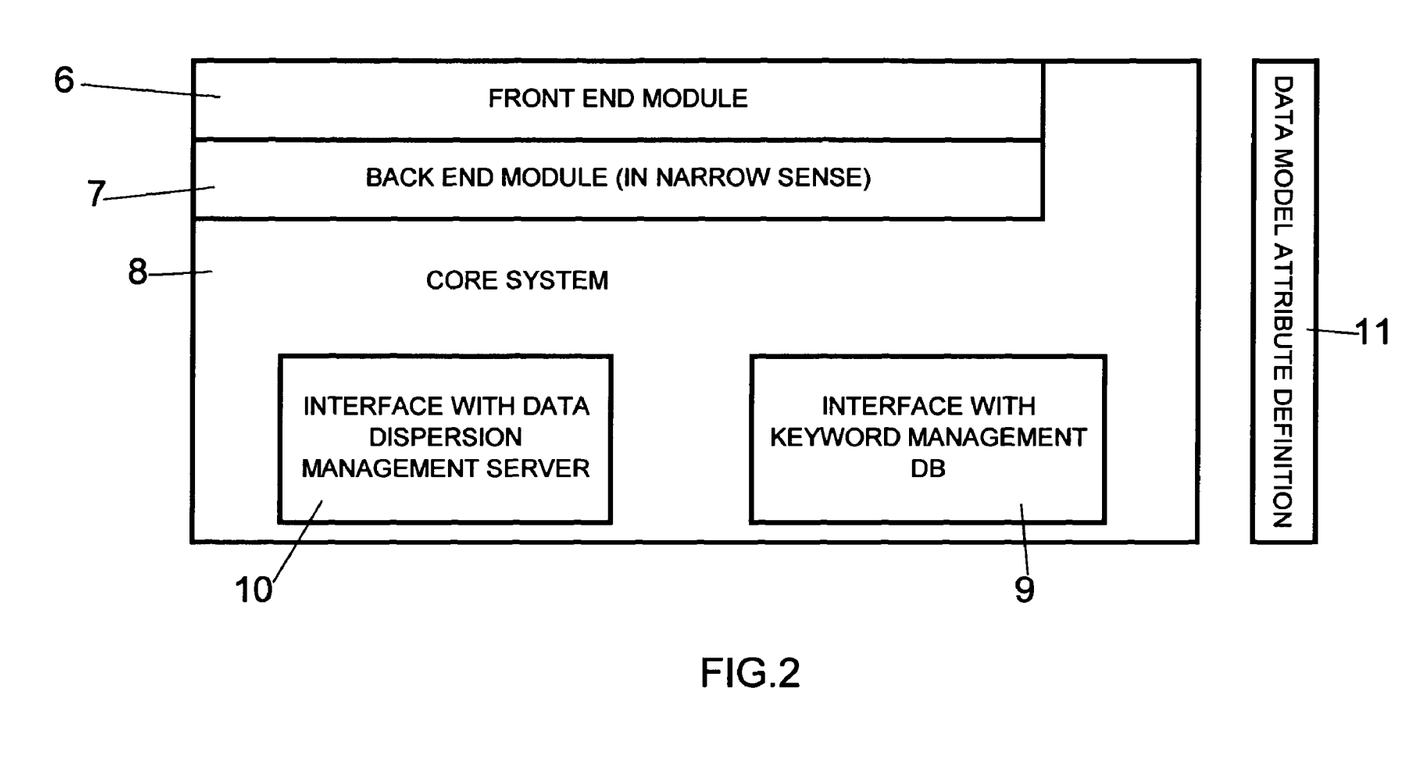
FIG. 2 is a diagram showing a software configuration of a personal information managing apparatus of the embodiment.

The software configuration of the personal information managing apparatus 1 will be described with reference to FIG. 2.

A front end module 6 (hereinbelow, "front end 6") is software for receiving an input from the user terminal 2 and performing a transaction using personal information. The front end 6 has a business logic adapted to transaction requirements and a user interface. When the necessity of storing or obtaining data arises in the front end 6, a back end module 7 in a narrow sense performs a data storing/obtaining process in place of the front end 6. With reference to a data model attribute definition 11 describing characteristics of data according to the transaction requirements, data is stored in the dispersion management server 3 and/or the keyword management DB 5. A core system 8 is general-purpose software which never depends on the transaction requirements and transmits/receives data via an interface 10 with the dispersion management server 3 and an interface 9 with the keyword management DB 5.

Since the back end 12 performs data management in consideration of the security protection, the front end 6 does not have to consider protection of information.

After the front end 6, the back end module 7 in the narrow sense and the core system 8 perform management (storage and acquisition) of data. Consequently, in the following description, unless otherwise specified, the back end module 7 in the narrow sense and the core system 8 will be collectively called a back end module 12 (hereinbelow, "back end 12") (in a broad sense).

Figure 3:
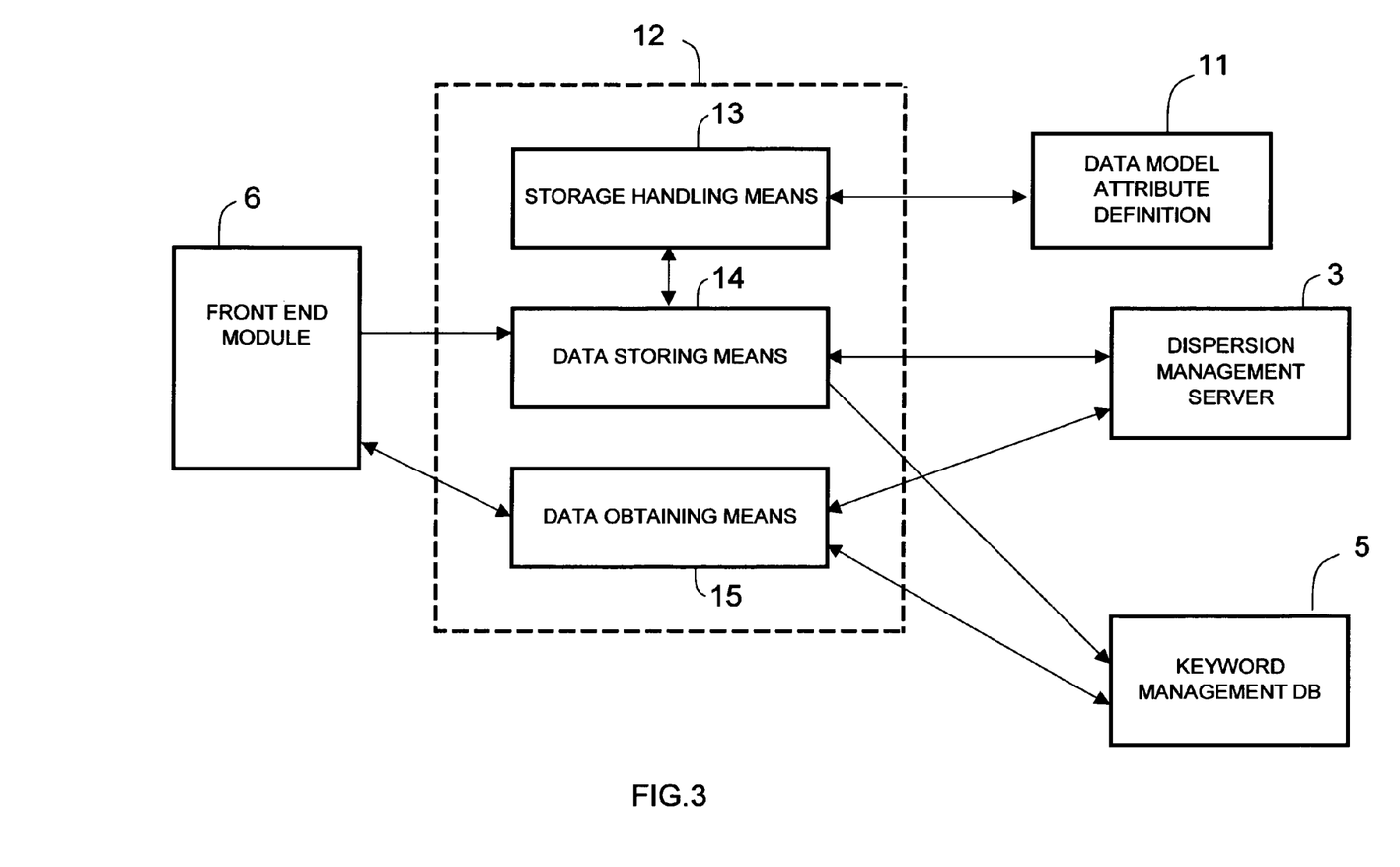
FIG. 3 is a diagram showing function blocks of a back end module (in a broad sense) of the embodiment.

The back end 12 has, storage handling means 13, data storing means 14, and data obtaining means 15 as shown in FIG. 3. The details of the means will be described later.

Relation Between Data Attribute and Data Physical Storing Form (1) Description of Protection Level The data storing means 14 considers the protection level of target data at the time of dividing data to be stored to the dispersion management server 3 and the keyword management DB 5.

Figure 4:
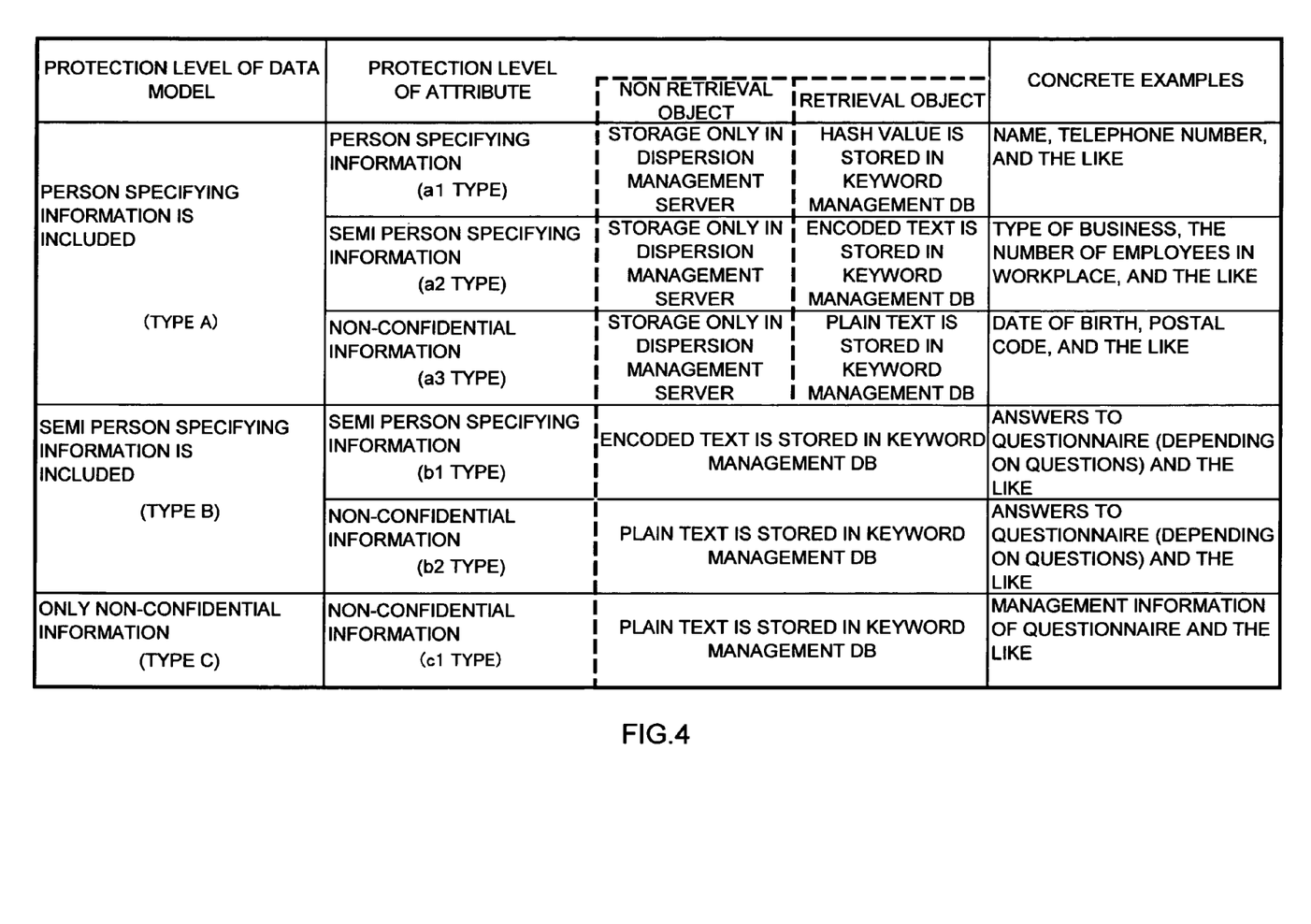
FIG. 4 is a diagram showing types of data protection levels.

As shown in FIG. 4, there are two types of protection levels; a protection level of a data model, and a protection level of an attribute. A data model is a set of one or more attributes and is a lump in a transaction. For example, in a questionnaire process, the name, sex, and the like constructing personal information of a respondent to a questionnaire correspond to attributes. The structured attributes correspond to a data model.

According to the two types of the protection levels, a data storage location (the dispersion management server 3 or the keyword management DB 5) and a form of the storage data (a hash value, an encrypted text, or a plain text) are determined.

Since the data model of type A in FIG. 4 includes person specifying information a1, it is necessary to carefully handle the data model. The data model of type A is basically stored in the dispersion management server 3. Desirably, the person specifying information is under control of the dispersion management server 3 and does not become a key for search or extraction. However, depending on a transaction, there is also a case that a search has to be made with the person specifying information. Therefore, the attribute value is stored in the keyword management DB 5 in addition to the dispersion management server 3, thereby enabling a unique search. Since it is not good from the viewpoint of security to use an attribute value as it is, that is, a plain text, the attribute value is processed to a one-way hash value which is in an irreversible state, and the one-way hash value is stored.

To make semi person specifying information a2 retrievable, the attribute value is encrypted and the encrypted attribute value is stored in the keyword management DB 5. By the semi person specifying information a2 itself, a person is not specified. However, a plurality of pieces of semi person specifying information can suggest a specific person, so that it is risky to store the semi person specifying information a2 in a plain text.

To make non-confidential information a3 retrievable, the non-confidential information a3 is stored in a plain text in the keyword management DB 5. Since a plain text is used as a key, not only the unique search but also a range search and a prefix search can be easily made.

When each of the person specifying information a1, the semi person specifying information a2, and the non-confidential information a3 is not an object to be retrieved, it is unnecessary to store the information in the keyword management DB 5.

As described above, all of attribute values of data models whose protection level is the type A are stored in the dispersion management server 3, and a table storing only an attribute to be retrieved is provided in the keyword management DB 5.

A data model of type B in FIG. 4 does not include person specifying information, so that it is not stored in the dispersion management server 3. The attribute value of semi person specifying information b1 is encrypted, and the attribute value of non-confidential information b2 in a plain text is stored as it is in the keyword management DB 5.

A data model of type C in FIG. 4 does not include the person specifying information and the semi person specifying information, so that it is not stored in the disperse/management server 3, and each of the attribute values in a plain text is stored as it is in the keyword management DB 5.

(2) Determination of Data Physical Storage Form

Next, how target data is divided and stored into the table in the keyword management DB 5 and the dispersion management server 3 will be described.

Although data stored in the dispersion management server 3 is divided into a plurality of storing media in reality, original data which is reconstructed and integrated will be used in the following description.

The way the storage handling means 13 refers to the data model attribute definition 11 and determines a data storing form will be described with reference to FIG. 5.

The data model attribute definition 11 is data describing the arrangement shown in FIG. 4 with respect to the attributes of data models, stored in a not-shown storage in the personal information managing apparatus 1, and read as necessary. In the data model attribute definition 11, an encryption method and a cipher key may be written. In this case, from the viewpoint of security, it is desirable to store the encryption method and the cipher key so as to be divided in the dispersion management server 3, and obtain them as necessary. In short, it is sufficient to satisfy both security protection and convenience.

Figure 5:
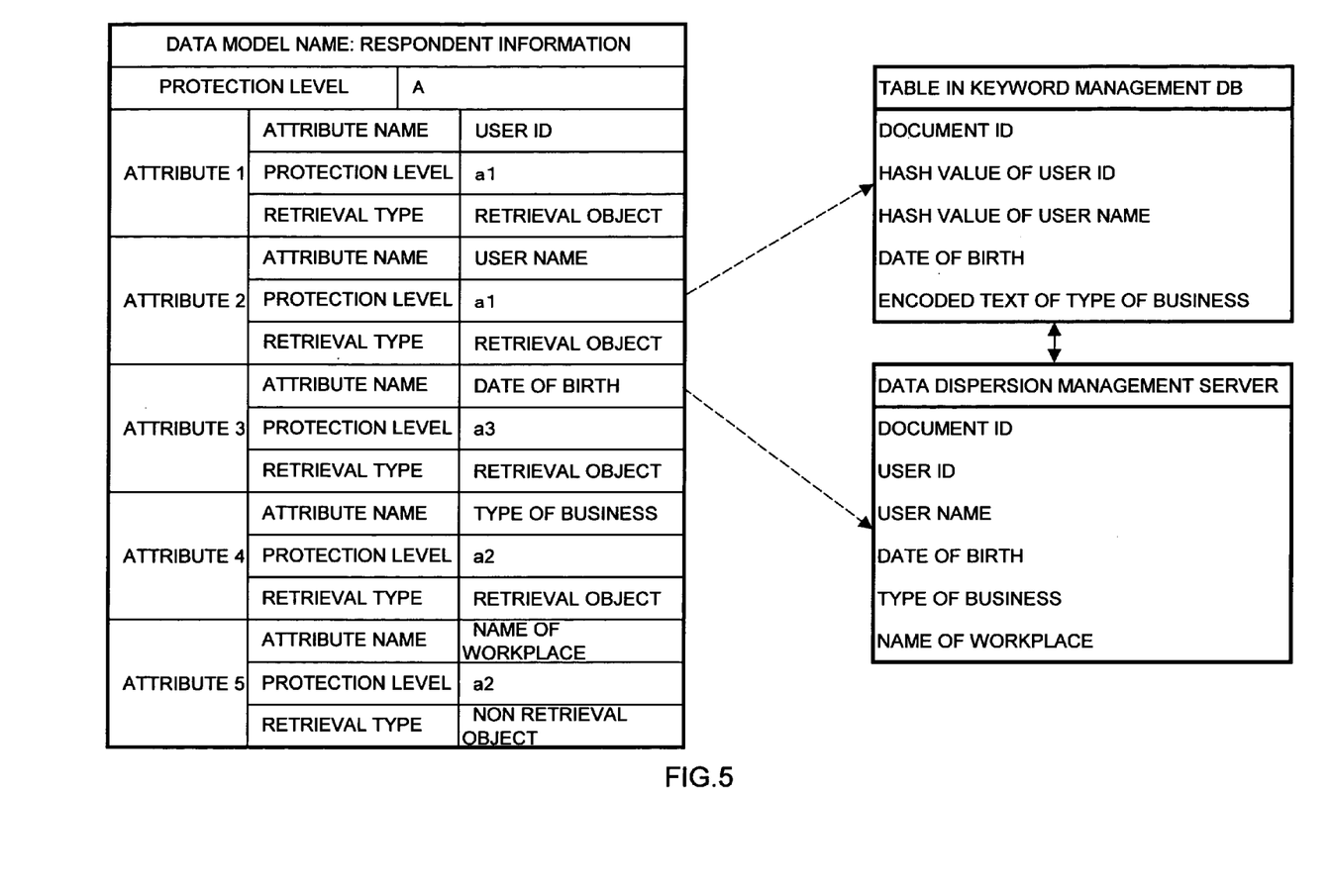
FIG. 5 is a diagram showing the relation between data model attribute definitions and storage forms of the embodiment.

The data model attribute definition 11 is illustrated in the left part of FIG. 5.

A data model "respondent information" has, as attributes, "user ID" and "user name" as person specifying information, so that the protection level of the data model itself is type A. It is determined that the management handling means 13 stores the attribute value in the dispersion management server 3.

The "user ID" and "user name" have the protection level a1 and are to be retrieved, so that the hash values of the attribute values are stored in the keyword management DB 5. "Date of birth" has the protection level a3 and is to be retrieved, so that it is stored in a plain text in the keyword management DB 5.

The protection level of "job" is a2, and "job" is an object to be retrieved. Consequently, "job" is encrypted and stored in the keyword management DB 5. On the other hand, although the protection level of "company name" is a2, "company name" is not an object to be retrieved, so that it is not stored in the keyword management DB 5.

The right part of FIG. 5 shows the correspondence between the data stored in the table in the keyword management DB 5 and the data stored in the dispersion management server 3. To link the data, document IDs are stored in both of them. The document IDs are used to reconstruct the divided data.

Figure 6:
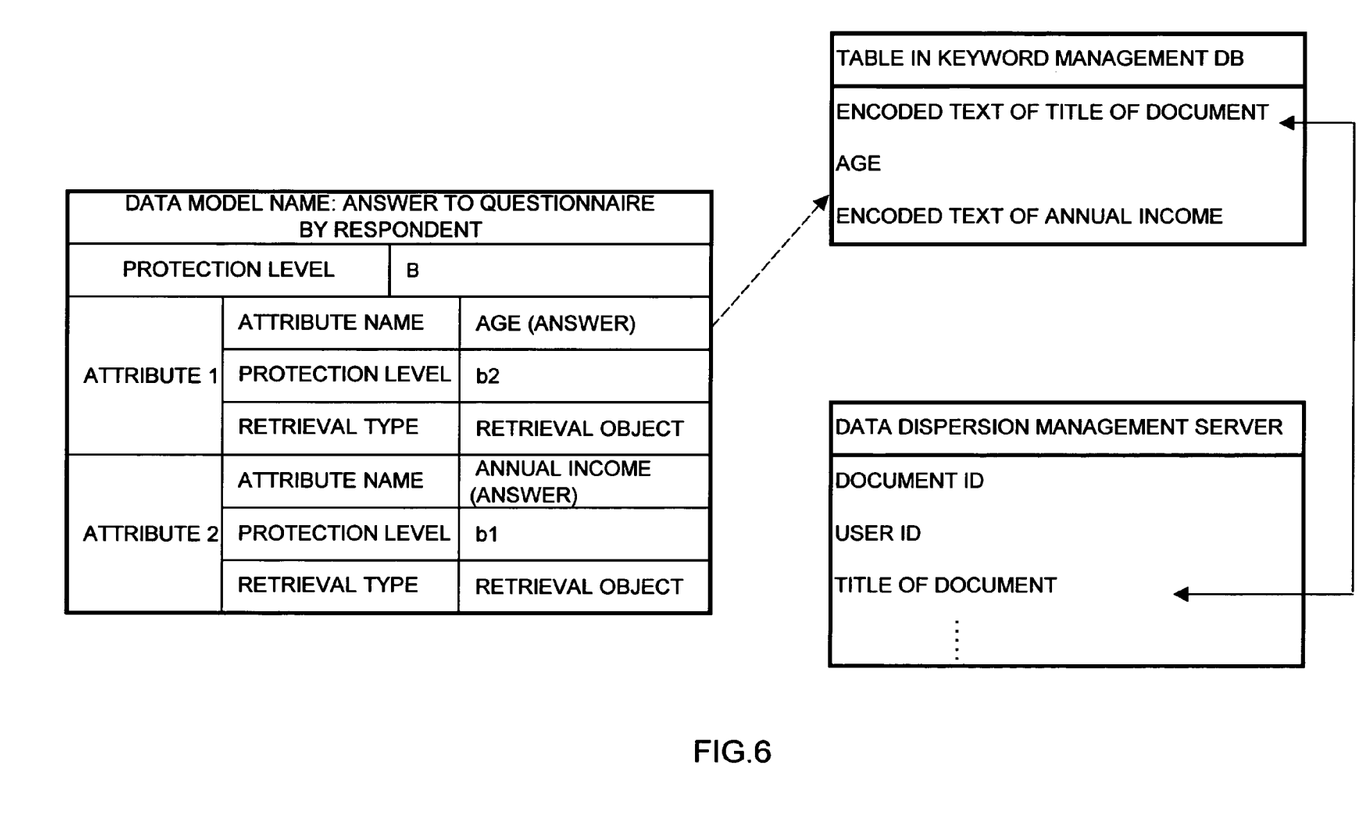
FIG. 6 is a diagram showing the relation between the data model attribute definitions and storage forms of the embodiment.

Referring now to FIG. 6, the storage form in the case where the protection level of a data model is B will be described.

The data model attribute definition 11 is illustrated in the left part of FIG. 6. The table stored in the keyword management DB 5 is shown in the right upper part of FIG. 6.

Since the protection level of a data model "answers to the questionnaire by respondent" is B, it is unnecessary to store the data model in the dispersion management server 3. To associate the data model with personal information stored in the dispersion management server 3, "title of document" stored in the dispersion management server 3 is also stored in the keyword management DB 5. Since the "title of document" is information unique to the specific person, it is encrypted and stored in the keyword management DB 5.

In the table corresponding to the data model having the protection level A, "user ID" is written as information unique to the specific person (see FIG. 5). The "user ID" and the "title of document" are different information. The corresponding relations among the "user ID", "title of document", and the information unconditionally specifying the person exist only for information stored so as to be dispersed in the dispersion management server 3. The arrangement of the present invention is directed to certainly protect the personal information.

By specifying attributes of a data model in the data model attribute definition 11 independently of software, the following advantage is obtained. In the case of changing a work or addressing a new data model, only by changing the data in the data model attribute definition 11, the change of the back end 12 can be made minimum or no change is required.

4. Storage of Data

Figure 7:
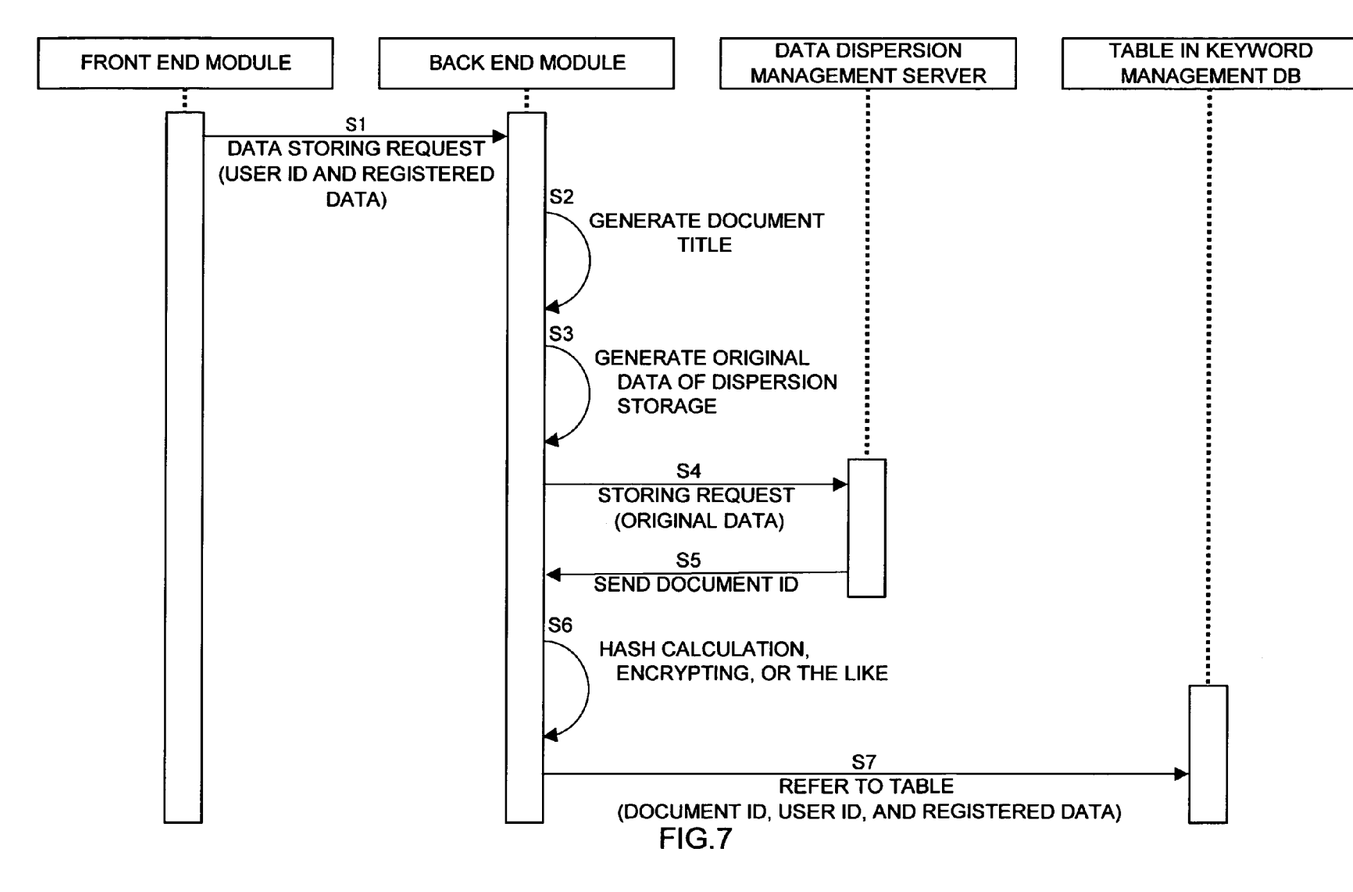
FIG. 7 is a sequence diagram showing data storing process in the embodiment.

Referring now to FIG. 7, the operation of the back end 12 performed in the case where a data storing request is newly generated from the front end 6 will be described.

A data storing request specifying data to be stored and user ID is sent from the front end 6 to the back end 12 (step Si).

The back end 12 generates a title of document in accordance with a predetermined rule (step S2), and adds the user ID and the title of document to the data to be stored, thereby generating data in a predetermined format in the dispersion management server 3 (step S3). The generated data is original data to be divided and stored in the dispersion management server 3. When a storing request is received (step S4), the dispersion management server 3 divides the original data into pieces by a predetermined method and stores the divided pieces of data into a plurality of storing media. At this time, the dispersion management server 3 generates a document ID as information for reconstructing the divided data. After completion of the division, storage, and generation of the document ID, the dispersion management server 3 sends the document ID to the back end 12 (step S5). After that, the back end 12 can obtain the data divided and stored by transmitting the document ID to the dispersion management server 3.

Next, the back end 12 has to register a table associated with the divided and stored data in the keyword management DB 5. To register the table, the back end 12 calculates a hash value by properly substituting an attribute value into a predetermined hash function or encrypts the attribute value on the basis of the result of reference to the data model attribute definition 11 by the storage handling means 13 (step S6). The back end 12 adds the document ID and the user ID to the attribute value hashed or the like, and registers the resultant data into the keyword management DB 5 (step S7).

5. Acquisition of Data

Figure 8:
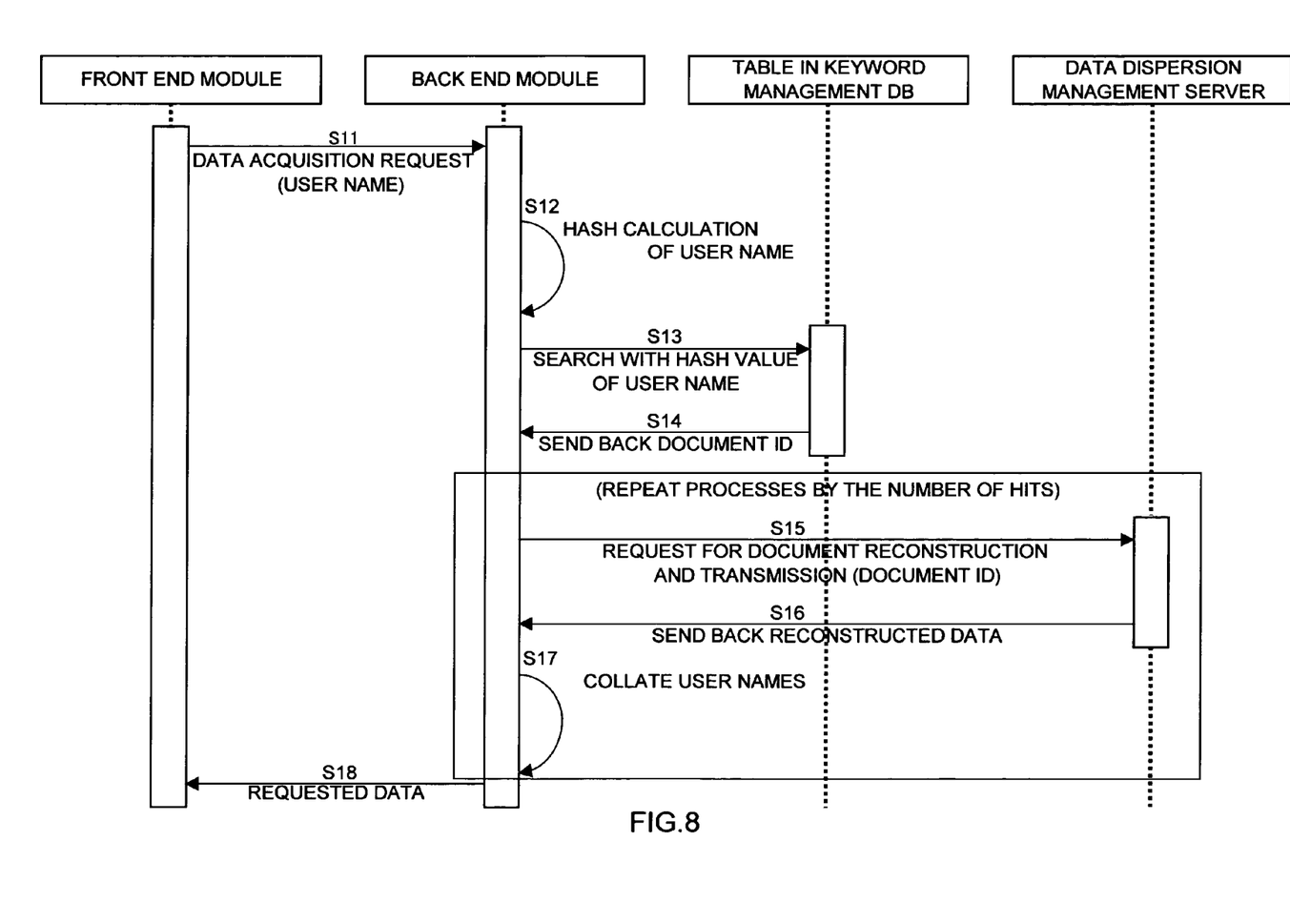
FIG. 8 is a sequence diagram showing data obtaining process in the embodiment.

Next, the operation of the back end 12 in the case where a data acquisition request is generated from the front end 6 will be described with reference to FIG. 8.

A data acquisition request designating the user name is transmitted from the front end 6 to the back end 12 (step S11).

The back end 12 refers to the data attribute definition and takes out the protection level of the user name. Since the protection level is a1, it is understood that the user name is stored in the hash value, not in a plain text, in the keyword management DB 5. The back end 12 hashes the designated user (step S12) and, with the obtained hash value, searches the keyword management DB 5 (step S13). When the hash values coincide with each other, the document ID is extracted (step S14). Then, the back end 12 transmits the document ID to the dispersion management server 3 and requests for reconstruction and transmission of the document (step S15). The dispersion management server 3 transmits the reconstructed data (step S16).

The back end 12 collates the user name included in the transmitted reconstructed data with the user name specified by the front end 6 (step S17). When the user names coincide with each other, the back end 12 sends the data to the front end 6 (step S18).

Although the user names are different from each other, there is a case such that, as a result of the hash calculation, the hash values become the same. In this case, a plurality of document IDs are returned instep S14, the processes in steps S15 to S17 are repeated until the user names coincide with each other.

Although the case of performing the retrieval and extraction by using the "user name" has been taken as an example in the above description, operations performed in the case of using other attributes are similar to the above. When the protection level is a2, it is necessary to perform encryption in step S12. When the protection level is a3, the step S12 is omitted and it is sufficient to make a search with a plain text in step S13.

Others

Although the front end 6 and the back end 12 are installed and operate in the same computer in the foregoing embodiment, they may be installed in different computers.

Although a transaction is executed in the configuration in which the user terminal is a client and the front end is a server, the configuration is illustrative. The invention is not limited to such a system configuration.

Although the three protection levels are set in the foregoing embodiment, the number of the protection levels is illustrative and the present invention is not limited to the number.

The number of cipher keys of the semi person specifying information is not limited to one. Different cipher keys may be provided for attributes.

In short, the embodiment disclosed above is illustrative in all of aspects and is not restrictive. Therefore, the embodiment can be variously modified. As long as modifications are based on the technical idea described in the scope of claims, the modifications are included in the technical scope of the present invention.

What is claimed is:

1. A personal information management system for handling personal information, the system being connectable to a personal information dispersion management server that encrypts the personal information by a secret sharing scheme, wherein the system decrypts the encrypted personal information with an index key for decrypting, the system comprising:

a search keyword management database wherein a group of keywords which are attribute values of the personal information, and the index key for decrypting, which is associated with the group of keywords, are stored in the search keyword management database; and a personal information management apparatus, which comprises:

a storage handler for determining a protection level of a data model including at least one attribute of the personal information and a protection level of each attribute for the personal information to be stored, determining whether to store the attribute in only the search keyword management database or in the personal information dispersion management server as well, on the basis of the determined protection level of the data model, and determining a storage form of each attribute on the basis of the determined protection level of the attribute;

a data storer that, when the protection level of the data model is a level that requires security protection of the personal information and a request for storing the personal information is generated, transmits the personal information to the personal information dispersion management server, obtains the index key for decrypting from the personal information dispersion management server, and stores each attribute included in the personal information so as to be associated with the index key for decrypting in a storage form according to the protection level into the search keyword management database, and that, when a request for storing the personal information in which the protection level of the data model is a level that does not require security protection is generated, stores all attribute values included in the personal information in a storage form according to the protection level of each attribute only into the search keyword management database; and a data obtainor that, when the protection level of the data model is a level that requires security protection of personal information and a personal information obtaining request is generated, retrieves the index key for decrypting with reference to the search keyword management database based on keywords entered along with the obtaining request, transmits the index key for decrypting to the personal information dispersion management server, and receives the personal information decrypted with the index key for decrypting from the personal information dispersion management server, and that, when a personal information obtaining request in which the protection level of the data model is a level that does not require security protection is generated, retrieves the requested personal information with reference to the search keyword management database based on keywords entered along with the obtaining request.

2. The personal information management system according to claim 1, wherein with reference to each data model attribute specifying data characteristics of personal information, the storage handler determines that the attribute uniquely specifying a person has a high protection level, the attribute in plural pieces by which a person can be specified has an intermediate protection level, and the attribute by which a person cannot be specified has a low protection level and the storage handler determines that the data model including at least one attribute having the high protection level has a level that requires security protection, and the data model that does not include any attributes having the high protection level has a level that does not require security protection.

3. The personal information management system according to claim 2, wherein in personal information to be stored in the search keyword management database, an attribute having the high protection level is hashed, an attribute having the intermediate protection level is encrypted and stored, and an attribute having the low protection level is stored in a plain text as it is.

4. A non-transitory computer readable medium storing thereon a personal information management program for making a computer perform the following steps:
   acquiring personal information;
   storing the personal information;
   connecting to a personal information dispersion management server that provides encrypted personal information by a secret sharing scheme;
   decrypting the encrypted personal information with an index key for decrypting;
   accessing a search keyword management database for storing a group of keywords which are attributes of the personal information and storing the index key for decrypting which is associated with the group of keywords;
   execute a transaction using the personal information;
   determine a protection level of a data model, including at least one attribute of the personal information, and a protection level of each attribute for the personal information to be stored;
   determine whether to store the attribute in only the search keyword management database or in the personal information dispersion management server as well, on the basis of the determined protection level of the data model, and determine a storage form of each attribute on the basis of the determined protection level of each attribute;
   when the protection level of the data model is a level that requires security protection of personal information and a request for storing the personal information is generated, transmitting the personal information to the personal information dispersion management server, obtaining the index key for decrypting from the personal information dispersion management server, and storing each attribute included in the personal information so as to be associated with the index key for decrypting in a storage form according to the protection level into the search keyword management database;
   when a request for storing the personal information in which the protection level of the data model is a level that does not require security protection is generated, store all attribute values included in the personal information in a storage form according to the protection level of each attribute only into the search keyword management database;
   when the protection level of the data model is a level that requires security protection of personal information and a personal information obtaining request is generated, retrieve the index key for decrypting with reference to the search keyword management database based on keywords entered along with the obtaining request, transmit the index key for decrypting to the personal information dispersion management server, and receive the personal information decrypted with the index key for decrypting from the personal information dispersion management server; and
   when a personal information obtaining request in which the protection level of the data model is a level that does not require security protection is generated, retrieve the requested personal information with reference to the search keyword management database based on keywords entered along with the obtaining request.

5. The non-transitory computer readable medium according to claim 4, further comprising making a computer perform the steps of:
   determine with reference to each data model attribute specifying data characteristics of personal information, that the attribute uniquely specifying a person has a high protection level, the attribute in plural pieces by which a person can be specified has an intermediate protection level, and the attribute by which a person cannot be specified has a low protection level; and
   determine that the data model including at least one attribute having the high protection level has a level that requires security protection, and the data model that does not include any attributes having the high protection level has a level that does not require security protection.

6. The non-transitory computer readable medium according to claim 5, further comprising for personal information to be stored in the search keyword management database, making a computer perform the following steps:
   hashing an attribute having the high protection level;
   encrypting and storing an attribute having the intermediate protection level and
   storing an attribute having the low protection level in a plain text as it is.

7. A personal information protecting method comprising:
   accessing a search keyword management database for storing a group of keywords which are attributes of personal information and for storing an index key for decrypting which is associated with the group of keywords;
   executing a transaction using the personal information;
   determining a protection level of a data model, including at least one attribute of the personal information, and a protection level of each attribute for the personal information to be stored;
   determining whether to store the attribute in only the search keyword management database or in a personal information dispersion management server as well, on the basis of the determined protection level of the data model, and determine a storage form of each attribute on the basis of the determined protection level of each attribute;

when the protection level of the data model is such a level that requires security protection of personal information and a request for storing the personal information is generated, transmitting the personal information to the personal information dispersion management server, obtaining the index key for decrypting from the personal information dispersion management server, and storing each attribute included in the personal information so as to be associated with the index key for decrypting in a storage form according to the protection level into the search keyword management database;

when a request for storing the personal information in which the protection level of the data model is a level that does not require security protection is generated, storing all attributes included in the personal information in a storage form according to the protection level of each attribute only into the search keyword management database;

when the protection level of the data model is a level that requires security protection of personal information and a personal information obtaining request is generated, retrieving the index key for decrypting with reference to the search keyword management database based on keywords entered along with the obtaining request, transmitting the index key for decrypting to the personal information dispersion management server, and receiving the personal information decrypted with the index key for decrypting from the personal information dispersion management server; and when a personal information obtaining request in which the protection level of the data model is a level that does not require security protection is generated, retrieving the requested personal information with reference to the search keyword management database based on keywords entered along with the obtaining request.

8. The method according to claim 7, comprising:
determining with reference to each data model attribute specifying data characteristics of personal information, that the attribute uniquely specifying a person has a high protection level, the attribute in plural pieces by which a person can be specified has an intermediate protection level, and the attribute by which a person cannot be specified has a low protection level; and determining that the data model including at least one attribute having the high protection level has a level that requires security protection, and the data model that does not include any attributes having the high protection level has a level that does not require security protection.

9. The method according to claim 8, wherein for personal information to be stored in the search keyword management database, further comprising:
hashing an attribute having the high protection level, encrypting and storing an attribute having the intermediate protection level, and storing an attribute having the low protection level in a plain text as it is.

* * * * *